May 7, 1957     E. W. CARR ET AL     2,791,228
TWO-WAY CHECK VALVE
Filed July 3, 1953
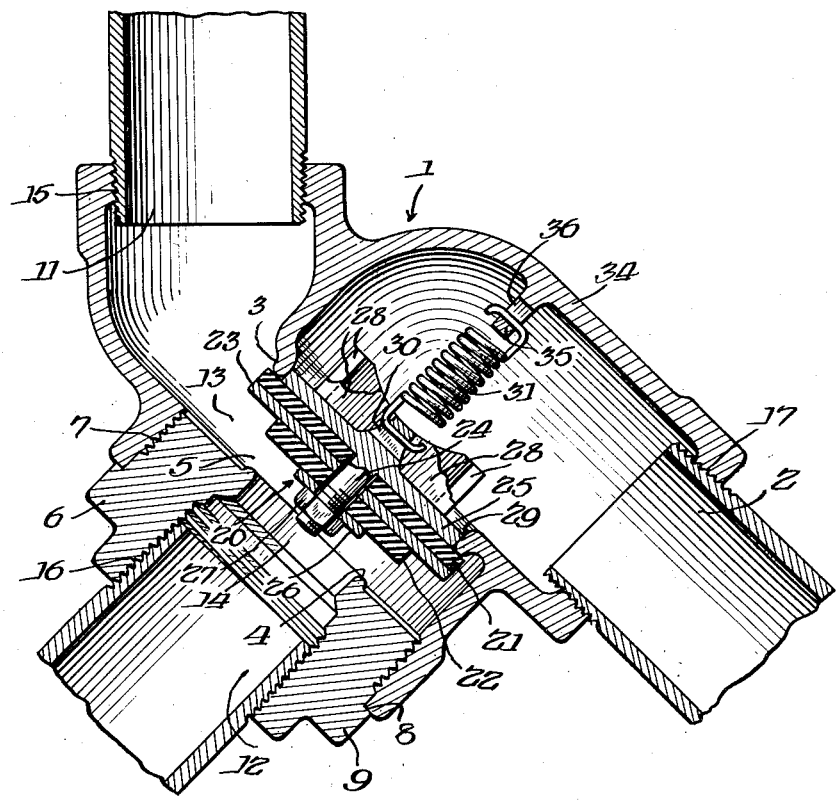
Inventors.
Edward W. Carr,
George E. Hansen, &
John Adelman.
By Joseph O. Lange, Atty.

2,791,228
TWO-WAY CHECK VALVE

Edward W. Carr, Cicero, George E. Hansen, Elmwood Park, and John Adelman, Chicago, Ill., assignors to Crane Co., Chicago, Ill., a corporation of Illinois Application July 3, 1953, Serial No. 365,966

3 Claims. (Cl. 137—107)

This invention relates generally to valves and more particularly is termed by those skilled in the art as a spring biased two way valve and sometimes is referred to as a two-way check valve.

One of the principal purposes of this invention is to provide a valve of the above type which will automatically drain pipelines when not in use.

Another objective and one of paramount importance is to provide a valve which will open or shift to the alternate position upon relative low application of line fluid pressure.

A further object is to provide a valve in which the valve closure member is moved or driven positively and relatively freely into the alternate sealed position.

A still further object is to provide a valve which is not only sensitive in initial or starting operation, but which is likewise quite responsive to the cessation of inlet pressure for the prompt withdrawal from the alternate seated position in opposition to the fluid head or back pressure exerted against the closure member in the reverse position.

Yet another object is to provide a valve according to the above in which the closure member will not release itself but which will be retained in the alternate position until the inlet pressure has substantially dropped.

Other objects and advantages will become more readily apparent upon proceeding with the following description read in light of the accompanying drawing, in which The single figure is a sectional assembly view of a preferred form of valve embodying our invention, showing the same in the normally retracted or closed position.

Referring more particularly to the drawing, the numeral 1 generally designates the body or casing of the valve, having an inlet 2 and a ported seat 3 in fluid communication with the latter passage. In parallel or in axial alignment therewith and in opposed spaced relation to the said seat 3, a second ported seat 4 is provided forming a chamber or space 5 between the two seats. For the purpose of this assembly, the said second ported seat is preferably contained in a removable portion or tailpiece 6 received within the underside or bottom portion of the valve body 1 as by means of the threading at 7. A shoulder 8 on an annular flange 9 limits the inward movement of this piece for providing predetermined spacing of the valve seats 3 and 4. Additional avenues of fluid transmission leading exterior of the valve body 1 are indicated by passages 11 and 12. The passage 11 communicates transversely at 13 with the space 5 between the said ported seats, while the passage 12 leads through the port 14, extending through the tailpiece 6. The outer ends of these avenues or passages are adapted as by threading at 15 and 16, respectively for the connection of usual piping or fittings. The inlet 2 is likewise adapted as by threading 17 for effecting a similar line connection.

A valve closure member generally designated 20 is mounted for reciprocal movement within the chamber 5 between the ported seats. The said closure member comprises upper and lower disc-like seating elements 21 and 22 preferably of resilient material such as rubber for sealing engagement with the valve seats 3 and 4, respectively. A metallic stiffener element 23 of circular or washer form is interposed between the discs, all of which latter assembly is mounted on a shank 24 of the closure base portion 25 by means of a washer 26 and a nut 27. The portion 25 thus forms a backing or support for the upper disc 21 and further extends into the port 29 of the seat 3 conforming to and substantially filling the same for a purpose later to be explained. Four radially disposed equally spaced rib elements 28 extend upwardly from the portion 25 being flush with the outer circumference of the latter for guidance of the disc member in its reciprocal movement. Preferably a tension spring 31 connects the top of the member as through an aperture 30 in the mounting portion 25 with an inner wall surface portion 34 of the body 1 above the ported seat 3 and adjacent the inlet 2 as through an aperture 36 in the protrusion 35 thereof.

In operation, it will be clear that the spring 31 normally biases or retains the closure member 20 in the closed or seated position with the ported seat 3. When desired to flush out or add fluid to a system connected to the valve at 15 for instance, fluid pressure entering through the inlet 2 acts on the valve closure member 20 to open the latter member and move it axially across the space 5 and into sealed engagement with the second ported seat 4 thereby permitting the flow of fluid into the transverse passage 11 and discharging from the valve through the opening at 15. When the inlet pressure ceases, the closure member immediately retracts or returns to its original position in seated contact with the ported seat 3 under the influence of the spring 31. This provides an alternate route for self drainage of the valve and the system connected thereto, through the port 14 and passage 12 without disassembly of the inlet connection. Further, immediate and responsive return of the closure member prevents contamination of the supply or alteration of the make up of the inlet fluid. This advantage would also apply if for instance treated water were introduced through the passage 12 and fresh water or differently treated water supplied through the inlet 2, either before or after the application of the first treated water. In all cases, it should be apparent that the inlet side of the valve will be immediately sealed upon cessation or termination of the inlet pressure.

It should be noted that the port 29 in the valve seat 3 is considerably larger than the opening 14 in the second ported seat. This is to provide an increased surface area upon which the inlet pressure acts for more sensitive opening of the valve and movement towards its alternate position than would otherwise be possible. In particular, this structural arrangement insures unseating of the valve in the first instance when under comparatively low inlet pressures.

To sustain the valve opening movement which otherwise has a tendency to become arrested intermediate the valve seats particularly under the lower pressures, the portion 25 of the closure which has already been described as extending into the port 29 substantially filling the same confines the inlet fluid for a considerable time after the valve has initially opened thereby to utilize the energy available in the fluid to the fullest extent in driving the closure member towards the alternate position and with sufficient force and impetus to seat the same in a positive manner against the ported seat 4.

The use of the latter driving head or closure portion 25 extending into the port 29 and also delaying otherwise unimpeded fluid flow into the passage 11 is possible only by the provision of an increased port area which when gauged to the size of the inlet 2 and to the opening at 16 which is the same in size permits the required fluid flow past the closure member when in the alternate seated position, even though the space is cut down to the extent of this portion. The increased port size referred to therefore not only provides for the application of a greater force for more sensitivity in response in opening and initial movement but also permits the use of the projecting head portion 25 which would otherwise be impossible because of restriction of fluid flow. The latter provision is necessary in order to cause the valve to open fully against the spring action and to move into the opposite sealed position for effecting desired fluid flow.

While possessing the advantages of an enlarged piston area on the inlet side as mentioned, it will be understood that when the closure member 20 has moved from its original position and is in contact with the ported seat 4, it will assume the characteristics of a smaller size piston inasmuch as the additional area over that covering the port 4 is balanced by the fluid pressure exerted on both sides thereof. This means that the valve closure member is retained in the lower or alternate position with less total force and therefore will be released much more readily and under the action of a much lighter spring 31 even against a considerable pressure head or back pressure exerted through vertical piping for instance connected to the valve at 15. The lighter spring also creates less resistance to the original opening movement from the seat 3 for action under less pressure and further, is sufficiently light so as not to pull the closure member away from the seat 4 in the alternate position until the inlet or holding pressure has substantially dropped. When it has dropped predeterminately, the closure member will immediately retract or return to its original position to seal off the inlet side of the valve and permit drainage through the then uncovered port 14 and passage 12. In connection with the latter condition, it should be noted that substantially free and unobstructed through drainage is provided when the valve is in the vertical position shown, which is the preferred position. The inlet side of the valve is also free to drain through the opening at 17, the closure portion 25 ejecting water from the port 29 when retracting. Such drainage is of course important particularly for outside installations as is the drainage on the other side to prevent damage and non-operation of the valve because of freezing.

Also worth of note here is the important feature of providing a simple tension spring 31, which is open and easily drainable, on the inlet side above the closure member where by the comparative simplicity of the spring and its mounting and the increased port area adjacent thereto resistance to fluid flow is minimized. This takes the place of the usual compression spring on the opposite side with its more complicated and bulky mounting and greater obstruction to fluid flow and drainage through the port 14 and passage 12. Such a compression spring arrangement would also require the use of a larger valve body or the spring mounting would extend beyond the opening at 16, either of which would produce a heavier valve with an exposed spring encouraging tampering and injury thereto. Besides being much simpler and more effective, the present arrangement results in a lighter and more compact valve of preferred design.

It should be evident from the foregoing description that a novel valve of the double seat check valve type has been produced which combines increased sensitivity in opening. It also assures full, positive actuation thereof even under low pressures with the ability to remain in the alternate seated position without prematurely returning until inlet pressure has terminated. At the same time, it allows for quickly releasing the valve from this position against appreciable back pressure upon such termination for effecting immediate sealing of the inlet side and permitting the free, unobstructed fluid drainage through the valve.

Although but a single embodiment has been shown and described, the invention should not be limited to that embodiment or to the details thereof but rather should be gauged by the appended claims falling within the spirit of the invention.

We claim:
1. In a valve construction, the combination comprising a body having an inlet and a ported seat in communication therewith and a second ported seat in opposed spaced apart relation with the first named ported seat, said body having a fluid passage extending transversely to connect with the space between said ported seats, a closure member reciprocally movable between said seats, resilient means for normally holding said closure member in seated engagement with said first ported seat, said closure member being adapted to move from said first named seat to open the valve upon the application of substantial fluid pressure through said inlet of the body and to move into fluid sealing engagement with said second ported seat thereby permitting the transmission of fluid into said transversely connected fluid passage, said first ported seat being of substantially greater port opening than the second ported seat, said closure member presenting an enlarged surface to the inlet pressure for more responsive opening of the valve, said closure member further being provided with a projecting cylindrical portion defining said enlarged surface and extending snugly into the port of said first ported seat to substantially fill the same when said member is in seating contact with said ported seat whereby to reduce flow during predetermined initial movement of the closure member from said seating contact and further expediting substantial movement thereof toward the second ported seat to move said closure member into fluid sealed engagement with the latter seat while diverting fluid flow into the transverse passage.

2. In a valve construction, the combination comprising a body having an inlet and a ported seat in communication therewith and a second ported seat in opposed spaced apart relation with the first ported seat, said body having a fluid passage connected transversely to connect with the space between said ported seats, a closure member therefor, resilient means for normally holding the said closure member in seated engagement with said first ported seat, said closure member being responsive upon the application of substantial fluid pressure through said inlet of the body to move into fluid sealing engagement with said second ported seat thereby permitting the transmission of fluid into said transversely connected fluid passage, said first ported seat being of substantially greater port opening than the second ported seat, said closure member thereby presenting an enlarged surface area to the inlet pressure for expediting opening of the valve in response to fluid pressure, said closure member further being provided on the enlarged surface area with a projecting substantially cylindrical portion which extends snugly into the port of said first ported seat and substantially fills the same when said closure member is in seating contact with said first ported seat whereby to confine the fluid pressure after initial opening and for effecting substantial movement thereof towards the second ported seat to position the said closure member into fluid sealed engagement with the latter seat, said body being suitably ported at an intermediate portion thereof immediately above said closure member to permit free and substantially complete drainage from said fluid passage through said second ported seat when the said closure member is in its normally retracted position, the said closure member in said latter position directing the flow of fluid from said intermediate ported body portion into the port defined by the second seat.

3. In a valve construction, the combination comprising a body having an inlet and a ported seat in communication therewith and a second ported seat in parallel opposed spaced apart relation with the first named seat, said body having two additional avenues of fluid transmission leading exterior of the body, one of these avenues leading through the port in said second ported seat, the other avenue being in communication transversely with the space between said ported seats, a closure member reciprocally movable between said ported seats, resilient means connected within the inlet to said body and to the said closure member for normally retaining said closure member in seated engagement with said first ported seat to prevent the passage of fluid back through said inlet from said additional avenues of fluid transmission, said closure member being adapted to open upon the application of fluid pressure through said inlet and to move into fluid sealing engagement with said second ported seat thereby permitting the flow of fluid through said other additional avenue of fluid transmission in transverse communication with the space between said ported seats, said first ported seat being of substantially greater port opening than the second seated port, said closure member having an enlarged piston portion exposed to the inlet pressure for effecting more sensitive and positive valve actuation, said enlarged piston area in the seated position of the said closure member being wholly and closely received peripherally within the port of said first named seat, said closure member also having on an opposite side thereof a substantially reduced effective area to retain the closure member in the alternate sealed position with said second port seat, the said piston portion including radially extending means extending through said first named seat port and defining a substantial portion of an inner end of the enlarged piston area.

References Cited in the file of this patent

UNITED STATES PATENTS

| | | |
|---|---|---|
| 635,624 | Weeks | Oct. 24, 1899 |
| 1,522,809 | Collins | Jan. 13, 1925 |
| 1,665,394 | Willoughby | Apr. 10, 1928 |
| 1,972,737 | Hewitt | Sept. 4, 1934 |
| 2,040,580 | Vorech | May 12, 1936 |
| 2,133,804 | Brooks | Oct. 18, 1938 |
| 2,282,188 | Horne | May 5, 1942 |
| 2,358,228 | Hoof | Sept. 12, 1944 |
| 2,459,583 | Peter | Jan. 18, 1949 |
| 2,620,125 | Kilchemann | Dec. 2, 1952 |
| 2,623,540 | Palermo | Dec. 30, 1952 |

FOREIGN PATENTS

| | | |
|---|---|---|
| 652,478 | Great Britain | Apr. 25, 1951 |
| 759,867 | France | Dec. 6, 1933 |